(12) United States Patent
Cronin et al.

(10) Patent No.: US 7,774,559 B2
(45) Date of Patent: Aug. 10, 2010

(54) METHOD AND SYSTEM FOR TERMINATING WRITE COMMANDS IN A HUB-BASED MEMORY SYSTEM

(75) Inventors: Jeffrey J. Cronin, Andover, MN (US); Douglas A. Larson, Lakeville, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/895,894

(22) Filed: Aug. 27, 2007

(65) Prior Publication Data

US 2007/0300023 A1    Dec. 27, 2007

Related U.S. Application Data

(63) Continuation of application No. 10/857,467, filed on May 28, 2004, now Pat. No. 7,363,419.

(51) Int. Cl.
*G06F 12/00* (2006.01)

(52) U.S. Cl. .................... 711/154; 711/112; 711/105

(58) Field of Classification Search ................ None
See application file for complete search history.

(56) References Cited

U.S. PATENT DOCUMENTS

| | | | |
|---|---|---|---|
| 3,742,253 A | 6/1973 | Kronies | 307/247 |
| 4,045,781 A | 8/1977 | Levy et al. | 364/200 |
| 4,078,228 A | 3/1978 | Miyazaki | 340/147 R |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,608,702 A | 8/1986 | Hirzel et al. | 375/110 |
| 4,707,823 A | 11/1987 | Holdren et al. | 370/1 |
| 4,724,520 A | 2/1988 | Athanas et al. | 364/200 |
| 4,831,520 A | 5/1989 | Rubinfeld et al. | 364/200 |
| 4,843,263 A | 6/1989 | Ando | 307/480 |

(Continued)

FOREIGN PATENT DOCUMENTS

EP    0 709 786 A1    5/1996

(Continued)

OTHER PUBLICATIONS

"Free On-Line Dictionary of Computing" entry 'Flash Erasable Programmable Read-Only Memory, online May 17, 2004 [http://foldoc.doc.ic.ac.uk/foldoc/foldoc.cgi?flash+memory].

(Continued)

*Primary Examiner*—Reginald G Bragdon
*Assistant Examiner*—Thanh D Vo
(74) *Attorney, Agent, or Firm*—Dorsey & Whitney LLP

(57) ABSTRACT

A memory hub receives downstream memory commands and processes each received downstream memory command to determine whether the memory command includes a write command directed to the memory hub. The memory hub operates in a first mode when the write command is directed to the hub to develop memory access signals adapted to be applied to memory devices. The memory hub operates in a second mode when the write command is not directed to the hub to provide the command's write data on a downstream output port adapted to be coupled to a downstream memory hub.

19 Claims, 3 Drawing Sheets

U.S. PATENT DOCUMENTS

| | | | |
|---|---|---|---|
| 4,891,808 A | 1/1990 | Williams | 370/112 |
| 4,930,128 A | 5/1990 | Suzuki et al. | 371/12 |
| 4,953,930 A | 9/1990 | Ramsey et al. | 350/96.11 |
| 4,982,185 A | 1/1991 | Holmberg et al. | 340/825.21 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,269,022 A | 12/1993 | Shinjo et al. | 395/700 |
| 5,299,293 A | 3/1994 | Mestdagh et al. | 359/110 |
| 5,313,590 A | 5/1994 | Taylor | 395/325 |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | 395/575 |
| 5,355,391 A | 10/1994 | Horowitz et al. | 375/36 |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,461,627 A | 10/1995 | Rypinski | 370/95.2 |
| 5,465,229 A | 11/1995 | Bechtolsheim et al. | 345/477 |
| 5,479,370 A | 12/1995 | Furuyama et al. | 365/189.12 |
| 5,497,476 A | 3/1996 | Oldfield et al. | 395/439 |
| 5,502,621 A | 3/1996 | Schumacher et al. | 361/760 |
| 5,544,319 A | 8/1996 | Acton et al. | 395/200.07 |
| 5,566,325 A | 10/1996 | Bruce, II et al. | 395/494 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,638,334 A | 6/1997 | Farmwald et al. | 365/230.03 |
| 5,659,798 A | 8/1997 | Blumrich et al. | 395/846 |
| 5,687,325 A | 11/1997 | Chang | 395/284 |
| 5,706,224 A | 1/1998 | Srinivasan et al. | 365/49 |
| 5,715,456 A | 2/1998 | Bennett et al. | 395/652 |
| 5,729,709 A | 3/1998 | Harness | 395/405 |
| 5,748,616 A | 5/1998 | Riley | 370/242 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,900,020 A | 5/1999 | Safranek et al. | 711/167 |
| 5,928,343 A | 7/1999 | Farmwald et al. | 710/104 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,014,721 A | 1/2000 | Arimilli et al. | 710/129 |
| 6,023,726 A | 2/2000 | Saksena | 709/219 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,038,630 A | 3/2000 | Foster et al. | 710/132 |
| 6,061,263 A | 5/2000 | Boaz et al. | 365/51 |
| 6,061,296 A | 5/2000 | Ternullo, Jr. et al. | 365/233 |
| 6,064,706 A | 5/2000 | Driskill et al. | 375/372 |
| 6,067,262 A | 5/2000 | Irrinki et al. | 365/201 |
| 6,067,649 A | 5/2000 | Goodwin | 714/718 |
| 6,073,190 A | 6/2000 | Rooney | 710/56 |
| 6,076,139 A | 6/2000 | Welker et al. | 711/104 |
| 6,079,008 A | 6/2000 | Clery, III | 712/11 |
| 6,098,158 A | 8/2000 | Lay et al. | 711/162 |
| 6,100,735 A | 8/2000 | Lu | 327/158 |
| 6,105,075 A | 8/2000 | Ghaffari | 710/5 |
| 6,125,431 A | 9/2000 | Kobayashi | 711/154 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 | 3/2001 | Fisch et al. | 327/141 |
| 6,219,725 B1 | 4/2001 | Diehl et al. | 710/26 |
| 6,223,301 B1 | 4/2001 | Santeler et al. | 714/6 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,325 B1 | 7/2001 | Park | 370/503 |
| 6,256,692 B1 | 7/2001 | Yoda et al. | 710/104 |
| 6,272,600 B1 | 8/2001 | Talbot et al. | 711/140 |
| 6,272,609 B1 | 8/2001 | Jeddeloh | 711/169 |
| 6,278,755 B1 | 8/2001 | Baba et al. | 375/360 |
| 6,285,349 B1 | 9/2001 | Smith | 345/147 |
| 6,286,083 B1 | 9/2001 | Chin et al. | 711/151 |
| 6,289,068 B1 | 9/2001 | Hassoun et al. | 375/376 |
| 6,294,937 B1 | 9/2001 | Crafts et al. | 327/158 |
| 6,301,637 B1 | 10/2001 | Krull et al. | 711/112 |
| 6,324,485 B1 | 11/2001 | Ellis | 702/117 |
| 6,327,642 B1 | 12/2001 | Lee et al. | 711/120 |
| 6,327,650 B1 * | 12/2001 | Bapst et al. | 712/228 |
| 6,330,205 B2 | 12/2001 | Shimizu et al. | 365/230.06 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,367,074 B1 | 4/2002 | Bates et al. | 717/11 |
| 6,370,068 B2 | 4/2002 | Rhee | 365/196 |
| 6,373,777 B1 | 4/2002 | Suzuki | 365/230.03 |
| 6,381,190 B1 | 4/2002 | Shinkai | 365/230.03 |
| 6,392,653 B1 | 5/2002 | Malandain et al. | 345/501 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,434,639 B1 | 8/2002 | Haghighi | 710/39 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,462,978 B2 | 10/2002 | Shibata et al. | 365/63 |
| 6,463,059 B1 | 10/2002 | Movshovich et al. | 370/389 |
| 6,467,013 B1 | 10/2002 | Nizar | 711/1 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,479,322 B2 | 11/2002 | Kawata et al. | 438/109 |
| 6,487,556 B1 | 11/2002 | Downs et al. | 707/101 |
| 6,490,188 B2 | 12/2002 | Nuxoll et al. | 365/63 |
| 6,493,803 B1 | 12/2002 | Pham et al. | 711/147 |
| 6,496,909 B1 | 12/2002 | Schimmel | 711/163 |
| 6,501,471 B1 | 12/2002 | Venkataraman et al. | 345/424 |
| 6,505,287 B2 | 1/2003 | Uematsu | 711/170 |
| 6,523,092 B1 | 2/2003 | Fanning | 711/134 |
| 6,523,093 B1 | 2/2003 | Bogin et al. | 711/137 |
| 6,526,483 B1 | 2/2003 | Cho et al. | 711/154 |
| 6,539,490 B1 | 3/2003 | Forbes et al. | 713/401 |
| 6,552,564 B1 | 4/2003 | Forbes et al. | 326/30 |
| 6,564,329 B1 | 5/2003 | Cheung et al. | 713/322 |
| 6,587,912 B2 | 7/2003 | Leddige et al. | 711/5 |
| 6,590,816 B2 | 7/2003 | Perner | 365/200 |
| 6,594,713 B1 | 7/2003 | Fuoco et al. | 710/31 |
| 6,594,722 B1 | 7/2003 | Willke, II et al. | 710/313 |
| 6,598,154 B1 | 7/2003 | Vaid et al. | 712/237 |

| | | | |
|---|---|---|---|
| 6,615,325 B2 | 9/2003 | Mailloux et al. | 711/154 |
| 6,622,186 B1 | 9/2003 | Moniot et al. | 710/52 |
| 6,622,188 B1 | 9/2003 | Goodwin et al. | 710/101 |
| 6,622,227 B2 | 9/2003 | Zumkehr et al. | 711/167 |
| 6,628,294 B1 | 9/2003 | Sadowsky et al. | 345/568 |
| 6,629,220 B1 | 9/2003 | Dyer | 711/158 |
| 6,631,440 B2 | 10/2003 | Jenne et al. | 711/105 |
| 6,636,110 B1 | 10/2003 | Ooishi et al. | 327/565 |
| 6,636,912 B2 | 10/2003 | Ajanovic et al. | 710/105 |
| 6,646,929 B1 | 11/2003 | Moss et al. | 365/194 |
| 6,658,509 B1 | 12/2003 | Bonella et al. | 710/100 |
| 6,662,304 B2 | 12/2003 | Keeth et al. | 713/400 |
| 6,665,202 B2 | 12/2003 | Lindahl et al. | 365/49 |
| 6,667,895 B2 | 12/2003 | Jang et al. | 365/63 |
| 6,667,926 B1 | 12/2003 | Chen et al. | 365/221 |
| 6,670,833 B2 | 12/2003 | Kurd et al. | 327/156 |
| 6,681,292 B2 | 1/2004 | Creta et al. | 711/119 |
| 6,697,926 B2 | 2/2004 | Johnson et al. | 711/167 |
| 6,715,018 B2 | 3/2004 | Farnworth et al. | 710/300 |
| 6,718,440 B2 | 4/2004 | Maiyuran et al. | 711/137 |
| 6,721,195 B2 | 4/2004 | Brunelle et al. | 365/63 |
| 6,721,860 B2 | 4/2004 | Klein | 711/154 |
| 6,724,685 B2 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B2 | 5/2004 | Segelken et al. | 711/220 |
| 6,742,098 B1 * | 5/2004 | Halbert et al. | 711/172 |
| 6,745,275 B2 | 6/2004 | Chang | 710/305 |
| 6,751,703 B2 | 6/2004 | Chilton | 711/113 |
| 6,754,812 B1 | 6/2004 | Abdallah et al. | 712/234 |
| 6,756,661 B2 | 6/2004 | Tsuneda et al. | 257/673 |
| 6,760,833 B1 | 7/2004 | Dowling | 712/34 |
| 6,771,538 B2 | 8/2004 | Shukuri et al. | 365/185.05 |
| 6,775,747 B2 | 8/2004 | Venkatraman | 711/137 |
| 6,782,435 B2 | 8/2004 | Garcia et al. | 710/33 |
| 6,789,173 B1 | 9/2004 | Tanaka et al. | 711/147 |
| 6,792,059 B2 | 9/2004 | Yuan et al. | 375/354 |
| 6,792,496 B2 | 9/2004 | Aboulenein et al. | 710/306 |
| 6,795,899 B2 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B2 | 10/2004 | Wiliams | 711/170 |
| 6,804,764 B2 | 10/2004 | LaBerge et al. | 711/170 |
| 6,807,630 B2 | 10/2004 | Lay et al. | 713/2 |
| 6,811,320 B1 | 11/2004 | Abbott | 385/58 |
| 6,816,947 B1 | 11/2004 | Huffman | 711/151 |
| 6,820,181 B2 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,845,409 B1 | 1/2005 | Talagala et al. | 710/20 |
| 6,889,304 B2 | 5/2005 | Perego et al. | 711/170 |
| 6,901,494 B2 | 5/2005 | Zumkehr et al. | 711/167 |
| 6,904,556 B2 | 6/2005 | Walton et al. | 714/766 |
| 6,910,109 B2 | 6/2005 | Holman et al. | 711/156 |
| 6,912,612 B2 | 6/2005 | Kapur et al. | 710/309 |
| 6,947,672 B2 | 9/2005 | Jiang et al. | 398/135 |
| 6,980,042 B2 | 12/2005 | LaBerge | 327/291 |
| 7,046,060 B1 | 5/2006 | Minzoni et al. | 327/158 |
| 7,047,351 B2 | 5/2006 | Jeddeloh | 711/5 |
| 7,068,085 B2 | 6/2006 | Gomm et al. | 327/158 |
| 7,120,743 B2 | 10/2006 | Meyer et al. | 711/118 |
| 7,133,991 B2 | 11/2006 | James | 711/167 |
| 7,136,958 B2 | 11/2006 | Jeddeloh | 710/317 |
| 7,149,874 B2 | 12/2006 | Jeddeloh | 711/220 |
| 7,181,584 B2 | 2/2007 | LaBerge | 711/167 |
| 7,187,742 B1 | 3/2007 | Logue et al. | 375/376 |
| 7,251,714 B2 | 7/2007 | James | 711/167 |
| 7,257,683 B2 | 8/2007 | Jeddeloh et al. | 711/154 |
| 2001/0038611 A1 | 11/2001 | Darcie et al. | 370/248 |
| 2001/0039612 A1 | 11/2001 | Lee | 713/2 |
| 2002/0016885 A1 | 2/2002 | Ryan et al. | 711/105 |
| 2002/0084458 A1 | 7/2002 | Halbert et al. | 257/63 |
| 2002/0112119 A1 | 8/2002 | Halbert et al. | 711/115 |
| 2002/0116588 A1 | 8/2002 | Beckert et al. | 711/161 |
| 2002/0144064 A1 | 10/2002 | Fanning | 711/144 |
| 2003/0005223 A1 | 1/2003 | Coulson et al. | 711/118 |
| 2003/0005344 A1 | 1/2003 | Bhamidipati et al. | 713/400 |
| 2003/0043158 A1 | 3/2003 | Wasserman et al. | 345/545 |
| 2003/0043426 A1 | 3/2003 | Baker et al. | 359/109 |
| 2003/0093630 A1 | 5/2003 | Richard et al. | 711/154 |
| 2003/0149809 A1 | 8/2003 | Jensen et al. | 710/22 |
| 2003/0156581 A1 | 8/2003 | Osborne | 370/389 |
| 2003/0163649 A1 | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0217223 A1 | 11/2003 | Nino, Jr. et al. | 711/105 |
| 2003/0227798 A1 | 12/2003 | Pax | 365/189.12 |
| 2003/0229762 A1 | 12/2003 | Maiyuran et al. | 711/137 |
| 2003/0229770 A1 | 12/2003 | Jeddeloh | 711/213 |
| 2004/0022094 A1 | 2/2004 | Radhakrishnan et al. | 365/200 |
| 2004/0024948 A1 | 2/2004 | Winkler et al. | 710/311 |
| 2004/0044833 A1 | 3/2004 | Ryan | 711/5 |
| 2004/0047169 A1 * | 3/2004 | Lee et al. | 365/63 |
| 2004/0107306 A1 | 6/2004 | Barth et al. | 710/310 |
| 2004/0126115 A1 | 7/2004 | Levy et al. | 398/116 |
| 2004/0128449 A1 | 7/2004 | Osborne et al. | 711/137 |
| 2004/0144994 A1 | 7/2004 | Lee et al. | 257/200 |
| 2004/0160206 A1 | 8/2004 | Komaki et al. | 318/569 |
| 2004/0193821 A1 | 9/2004 | Ruhovets et al. | 711/167 |
| 2004/0199739 A1 | 10/2004 | Jeddeloh | 711/169 |
| 2004/0225847 A1 | 11/2004 | Wastlick et al. | 711/158 |
| 2004/0230718 A1 | 11/2004 | Polzin et al. | 710/22 |
| 2004/0236885 A1 | 11/2004 | Fredriksson et al. | 710/100 |
| 2004/0251936 A1 | 12/2004 | Gomm | 327/141 |
| 2005/0015426 A1 | 1/2005 | Woodruff et al. | 709/200 |
| 2005/0044327 A1 | 2/2005 | Howard et al. | 711/147 |
| 2005/0071542 A1 | 3/2005 | Weber et al. | 711/105 |
| 2005/0105350 A1 | 5/2005 | Zimmerman | 365/201 |
| 2005/0122153 A1 | 6/2005 | Lin | 327/291 |
| 2005/0149603 A1 | 7/2005 | DeSota et al. | 709/200 |
| 2005/0162882 A1 | 7/2005 | Reeves et al. | 365/63 |
| 2005/0166006 A1 | 7/2005 | Talbot et al. | 711/105 |
| 2005/0177677 A1 | 8/2005 | Jeddeloh | 711/100 |
| 2005/0177695 A1 | 8/2005 | Larson et al. | 711/167 |
| 2005/0213611 A1 | 9/2005 | James | 370/503 |
| 2006/0022724 A1 | 2/2006 | Zerbe et al. | 327/141 |
| 2006/0066375 A1 | 3/2006 | LaBerge | 327/291 |
| 2006/0136683 A1 | 6/2006 | Meyer et al. | 711/154 |
| 2006/0174070 A1 | 8/2006 | Jeddeloh | 711/150 |
| 2006/0218318 A1 | 9/2006 | James | 710/58 |
| 2006/0271746 A1 | 11/2006 | Meyer et al. | 711/148 |
| 2007/0033317 A1 | 2/2007 | Jeddeloh | 710/317 |
| 2009/0013211 A1 | 1/2009 | Vogt et al. | 714/5 |

FOREIGN PATENT DOCUMENTS

| | | |
|---|---|---|
| EP | 0 849685 A2 | 6/1998 |
| EP | 0910021 A1 | 4/1999 |
| JP | 06-104707 | 5/1994 |
| JP | 8-503800 | 4/1996 |
| JP | 2001265539 A | 9/2001 |
| JP | 2002-530731 | 9/2002 |
| JP | 2002-342161 | 11/2002 |
| JP | 2006-528394 | 12/2006 |
| TW | 498215 | 8/2002 |
| WO | WO 93/19422 | 9/1993 |
| WO | WO 02/23353 A2 | 3/2002 |
| WO | WO 02/27499 A2 | 4/2002 |

OTHER PUBLICATIONS

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-Pin Registered FBGA SDRAM DIMM", Micron Technology, Inc., 2002, pp. 1-23.

Rambus, Inc., "Direct Rambus™ Technology Disclosure", Oct. 1997. pp. 1-16.

Shanley, T. et al., "PCI System Architecture", Third Edition, Mindshare, Inc., 1995, pp. 24-25.

* cited by examiner

METHOD AND SYSTEM FOR TERMINATING WRITE COMMANDS IN A HUB-BASED MEMORY SYSTEM

This application is a continuation of U.S. patent application Ser. No. 10/857,467, filed May 28, 2004, now issued as U.S. Pat. No. 7,363,419.

TECHNICAL FIELD

This invention relates to computer systems, and, more particularly, to a computer system including a system memory having a memory hub architecture.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller known as a "north bridge," which also includes bus bridge circuitry for coupling the processor bus to an expansion bus, such as a peripheral connect interface ("PCI") bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay. Therefore, although SDRAM devices can synchronously output burst data at a high data rate, the delay in initially providing the data or latency can significantly slow the operating speed of a computer system using such SDRAM devices.

Another situation which increases latency in a conventional system memory is where a write command is immediately followed by a read command. When the controller issues a write command, the controller must wait until the write data is no longer present on or has "cleared" the data bus. This waiting by the controller increases the latency of the system memory because the read command cannot be applied to a required memory device until later in time. No data is being transferred on the data bus for a longer time after the write data has cleared the bus due to the latency of the memory devices, which lowers the bandwidth of the system memory. As frequencies increase, conventional system topologies can not meet timing requirements due to physical and electrical limitations. Thus memory hubs, a point to point solution are implemented.

One approach to alleviating the memory latency problem is to use multiple memory devices coupled to the processor through a memory hub. In a memory hub architecture, a system controller or memory controller is coupled over a high speed data link to several memory modules. Typically, the memory modules are coupled in a point-to-point or daisy chain architecture such that the memory modules are connected one to another in series. Thus, the memory controller is coupled to a first memory module over a first high speed data link, with the first memory module connected to a second memory module through a second high speed data link, and the second memory module coupled to a third memory module through a third high speed data link, and so on in a daisy chain fashion.

Each memory module includes a memory hub that is coupled to the corresponding high speed data links and a number of memory devices on the module, with the memory hubs efficiently routing memory requests and responses between the controller and the memory devices over the high speed data links. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Moreover, this architecture also provides for easy expansion of the system memory without concern for degradation in signal quality as more memory modules are added, such as occurs in conventional multi drop bus architectures.

Although computer systems using memory hubs may provide superior performance, they nevertheless may often fail to operate at optimum speeds for a variety of reasons. For example, even though memory hubs can provide computer systems with a greater memory bandwidth, they still suffer from latency problems of the type described above. One problem arises as write commands propagate from one memory hub to another. While a write command is propagating down stream, the controller must wait before issuing a subsequent read command to ensure no collision of data. Thus, although a given write command may be directed to the first hub downstream from the controller, for example, the controller must wait until it is sure the data has propagated to the last hub before issuing a subsequent read command to the last hub. This waiting by the controller delays the issuance of the read command and thereby increases the latency of the memory system.

There is a need for a system and method for reducing the latency of a system memory having a memory hub architecture.

SUMMARY OF THE INVENTION

According to one aspect of the present invention, a memory hub receives downstream memory requests and processes each received downstream memory request to determine whether the memory request includes a write command directed to the memory hub. The memory hub operates in a first mode when the write command is directed to the hub to develop memory access signals adapted to be applied to memory devices. The memory hub operates in a second mode when the write command is not directed to the hub to provide the command on a downstream output port adapted to be coupled to a downstream memory hub.

DETAILED DESCRIPTION OF THE INVENTION

Figure 1:
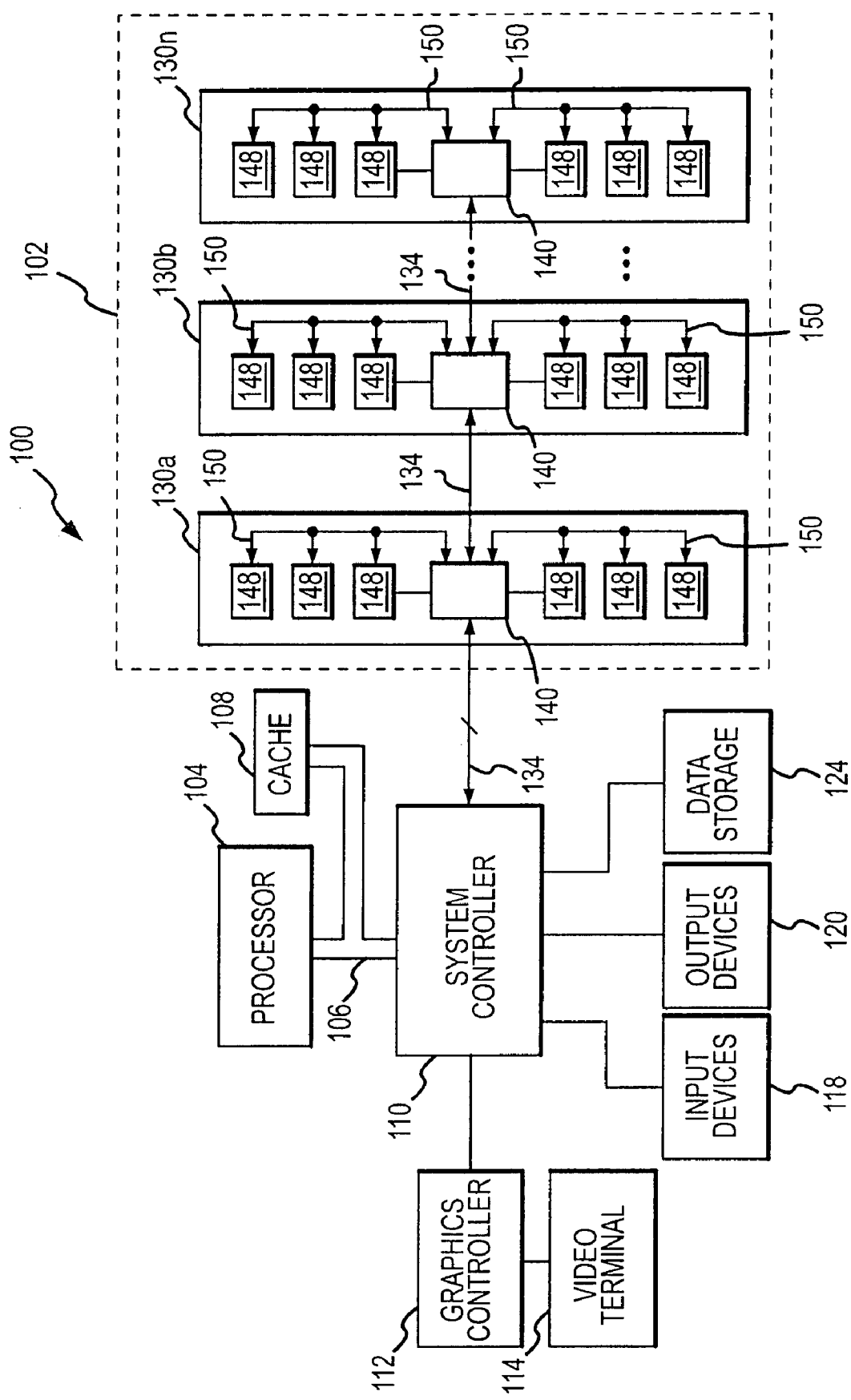
FIG. 1 is a block diagram of a computer system including a system memory having a high bandwidth memory hub architecture according to one example of the present invention.

A computer system 100 according to one example of the present invention is shown in FIG. 1. The computer system 100 includes a system memory 102 having a memory hub architecture that terminates write data at a destination hub, which allows the controller to issue a read command more quickly after a write command and thereby lowers the latency of the system memory, as will be explained in more detail below. In the following description, certain details are set forth to provide a sufficient understanding of the present invention. One skilled in the art will understand, however, that the invention may be practiced without these particular details. In other instances, well-known circuits, control signals, timing protocols, and/or software operations have not been shown in detail or omitted entirely in order to avoid unnecessarily obscuring the present invention.

The computer system 100 includes a processor 104 for performing various computing functions, such as executing specific software to perform specific calculations or tasks. The processor 104 is typically a central processing unit ("CPU") having a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 is further coupled to the system memory 102, which includes several memory modules 130a,b . . . n, and operates to apply commands to the memory modules to optimize the bandwidth of the system memory, as will be discussed in more detail below. The memory modules 130 are coupled in a point-to-point or daisy chain architecture through respective high speed links 134 coupled between the modules and the system controller 110. The high-speed links 134 may be optical, RF, or electrical communications paths, or may be some other suitable type of communications paths, as will be appreciated by those skilled in the art. In the event the high-speed links 134 are implemented as optical communications paths, each optical communication path may be in the form of one or more optical fibers, for example. In such a system, the system controller 110 and the memory modules 130 will each include an optical input/output port or separate input and output ports coupled to the corresponding optical communications paths.

Although the memory modules 130 are shown coupled to the system controller 110 in a daisy architecture, other topologies may also be used, such as a switching topology in which the system controller 110 is selectively coupled to each of the memory modules 130 through a switch (not shown), or a multi-drop architecture in which all of the memory modules 130 are coupled to a single high-speed link 134. Other topologies that may be used, such as a ring topology, will be apparent to those skilled in the art.

Each of the memory modules 130 includes a memory hub 140 for communicating over the corresponding high-speed links 134 and for controlling access to six memory devices 148, which are synchronous dynamic random access memory ("SDRAM") devices in the example of FIG. 1. The memory hubs 140 each include input and output ports that are coupled to the corresponding high-speed links 134, with the nature and number of ports depending on the characteristics of the high-speed links. A fewer or greater number of memory devices 148 may, be used, however, and memory devices other than SDRAM devices may also be used. The memory hub 140 is coupled to each of the system memory devices 148 through a bus system 150, which normally includes a control bus, an address bus, and a data bus.

In operation, each memory hub 140 receives downstream memory commands and processes these commands to determine whether a given command is directed to the corresponding memory module 130. More specifically, each memory hub 140 determines whether a given memory command includes a write command. When the memory hub 140 determines a memory request includes a write command, the memory hub next determines whether the write command is directed to the corresponding memory module 130. If this determination is negative, meaning the write command is not directed to the corresponding memory module 130, the memory hub 140 forwards the write command's data to the next downstream memory module. Conversely, if the determination is positive, indicating the write command is directed to the corresponding memory module 130, the memory hub 140 terminates the forwarding of the write command's data to the next downstream memory module. Moreover, the memory hub may terminate the write command to the next downstream memory module.

Each memory hub 140 thus determines whether a given write command is directed to the corresponding memory module 130, and if directed to that module terminates the propagation of the write command's data to downstream memory modules. Each memory hub 140 also forwards memory responses from downstream memory modules 130 to the next adjacent upstream memory module. Such memory responses may include, for example, read data corresponding to a read command directed to one of the downstream memory modules.

In the following description, a write command or read command is utilized in referring to the actual instruction applied to a memory module 130 and the write or read data associated with the instruction will be referred to separately.

A command may be considered, however, to include both the instruction portion and the data portion. Furthermore, it should be noted that each command will include some type of address or identification information which identifies the particular memory module 130 to which the command is directed. The system controller 110 thus accesses a particular memory module 130 by providing identification information in the command for the desired memory module.

Figure 2:
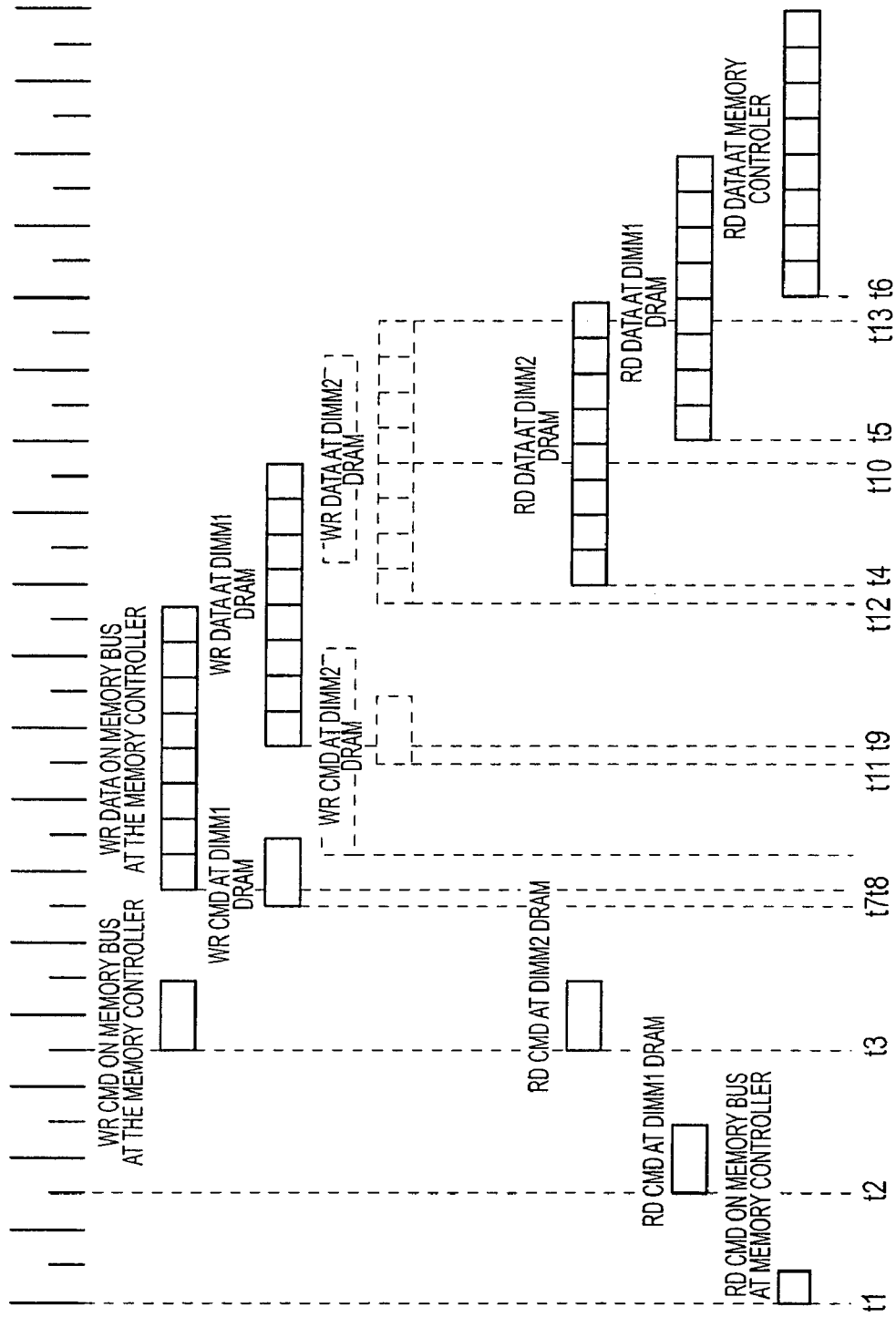
FIG. 2 is a signal timing diagram illustrating the timing in the system memory of FIG. 1 when the present write termination scheme is implemented.

The overall operation of the system controller 110 and system memory 102 will now be described in more detail with reference to the signal timing diagram of FIG. 2, which illustrates the timing of commands applied to the system memory by the system controller. FIG. 2 illustrates an example where the system controller 110 is writing data to the memory module 130a and reading data from the downstream memory module 130b. At a time t1, the system controller 110 applies a read command on the high-speed link 134 and this command is received at the memory module 130a at a time t2.

At this point, the memory hub 140 in the module 130a processes the received command and determines whether the command is directed to that memory module. In the present example, the read command is directed to the memory module 130b and thus the memory hub 140 in the memory module 130a forwards the command to the memory module 130b where it is received at a time t3. The memory hub 140 in module 130b processes the received read command, determines the command is directed to that module, and thereafter applies the appropriate signals on the bus system 150 to access the desired read data in the memory devices 148. The memory hub 140 in the module 130b places the read data on the high-speed link 134 starting at a time t4, with block representing read data placed on the high speed links 134. The read data is received at the module 130a starting at a time t5 and forwarded upstream to the system controller 110 where it is received starting at a time t 6.

Returning now to the time t 3, while the read command is being received and processed by the memory module 130b the system controller 110 places a write command on the high-speed link 134. The write command includes identification information corresponding to the memory module 130 to which data is to be written, namely module 130a. At a time t 7, the write command is received by the memory hub 140 in the module 130a and processed to determine whether the command is directed to that memory module. In the present example, the memory hub 140 in module 130a determines the write command is directed to that module and thereafter performs two operations. First, the memory hub 140 terminates the write command, meaning that the write command is not provided to the next downstream memory module 130b. Second, the memory hub 140 in module 130a processes the write command and thereafter applies the appropriate signals on the bus system 150 to access the desired storage locations the memory devices 148. In another embodiment of the invention, the write command may be passed to the next downstream hub 140, but the write data may be terminated.

While the memory hub 140 in module 130a is processing the received write command, system controller 110 places write data on the high-speed link 134 starting at a time t 8, where each block once again represents write data placed on the high-speed link. The write data is received at the memory module 130a starting at a time t9, and the memory hub 140 thereafter places the write data on the bus system 150 and develops the appropriate signals to transfer the write data into the desired storage locations in the memory devices 148.

At this point, the system controller 110 has written data to the memory module 130a. Note that the last word of write data being transferred to the module 130a is completed at a time t10, which is just before the time t5 when the first piece of the read data from module 130b is received at the module 130a. Thus, there is no collision of write data in read data on the high-speed link 134 between the system controller 110 and the memory module 130a. Moreover, the read data that is received at the system controller 110 at the time t6 occurs earlier in time than in a conventional system because the memory hub 140 in module 130b need not wait for the write data to pass through that memory module. This is true because the hub 140 in module 130a terminates downstream propagation of the write data once the hub determined the write command was directed to the corresponding module 130a.

In FIG. 2, the dotted lines starting at times t11 and t12 represent when the write command and write data, respectively, would have arrived at module 130b if the write data had not been terminated by module 130a. FIG. 2 illustrates that if the write data had not been terminated by module 130a, then the read data from module 130b could not be provided until approximately a time t13, which is after the write data passed through module 130b. If it is assumed data is transferred on each edge of clock signal (shown in FIG. 2) such that eight data words are transferred in four clock cycles, then termination of the write data results in read data being returned four clock cycles earlier than if the write data was not terminated.

Figure 3:
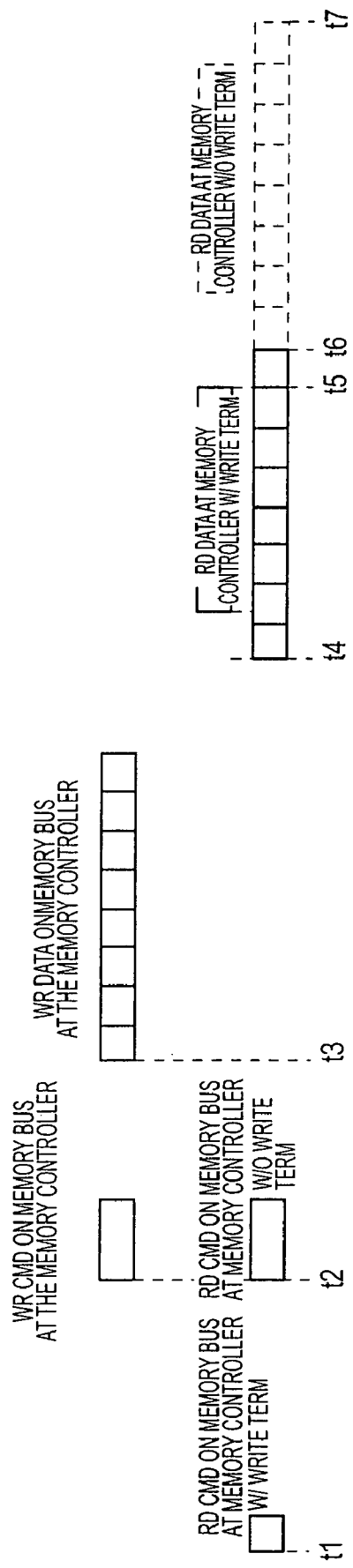
FIG. 3 is a signal timing diagram illustrating the lower latency of the system memory of FIG. 1 executing the write termination scheme of FIG. 2 when compared to the timing of a conventional system memory without the write termination scheme.

FIG. 3 is a signal timing diagram illustrating the lower latency of the system memory 102 of FIG. 1 due to the write termination scheme just described with reference to FIG. 2 when compared to the timing of a conventional system memory without the write termination scheme. As seen in FIG. 3, with the system memory 102 the memory controller 110 issues the read command first at a time t1 and thereafter issues a write command at a time t2. The system controller 110 then places the write data on the high speed link 134 at a time t3 and the read data are received by the controller starting at a time t4 and ending at a time t5. If no write termination was performed by the memory hubs 140, the system controller 110 would not issue the read command until approximately the time t2 and would not receive the read data until a period starting at a time t6 and ending at a time t7. The time t7 is four clock cycles after the time t5 at which the controller 110 has received all the read data when write termination is performed. Accordingly, the latency of the system memory 102 is reduced by four clock cycles, which is significant since during four clock cycles, 8 data words may be transferred.

The write termination performed by the memory hubs 140, lowers the latency of the system memory 102, and thereby increases the bandwidth of the memory. This write termination scheme is particularly useful when data is to be written to a first memory module 130 that is upstream of a second downstream memory module. As described above, in a conventional system the controller must time the issue of the write command and then time the issuance of the read command so that the write data does not collide with the read data. Termination of the write data at the upstream module 130 allows the controller 110 to actually issue the read command before the write command, which is the converse of a conventional system, and the earlier issuance of the read command lowering the latency of the system memory.

With the system memory 102, the system controller 110 knows the physical location of the modules 130 relative to one another, and thus knows precisely when to issue the read and write commands. For example, data is to be read from memory module 130z and written to memory module 130a, the controller 110 may issue the read command very early relative to the write command since the returning read data will be delayed as it progresses through the intervening hubs 140 on the corresponding memory modules 130b-y. In contrast, if data is to be read from memory module 130b and written to memory module 130a, the controller 110 will still issue the read command prior to the write command but not as early as in the prior situation where data was being read from module 130z.

One skilled in the art will understand suitable circuitry for forming the components of the computer system 100, such as the memory hubs 140 so that these components perform the described functionality. In the preceding description, certain details were set forth to provide a sufficient understanding of the present invention. One skilled in the art will appreciate, however, that the invention may be practiced without these particular details. Furthermore, one skilled in the art will appreciate that the example embodiments described above do not limit the scope of the present invention, and will also understand that various equivalent embodiments or combinations of the disclosed example embodiments are within the scope of the present invention. Illustrative examples set forth above are intended only to further illustrate certain details of the various embodiments, and should not be interpreted as limiting the scope of the present invention. Also, in the description above the operation of well known components has not been shown or described in detail to avoid unnecessarily obscuring the present invention. Finally, the invention is to be limited only by the appended claims, and is not limited to the described examples or embodiments of the invention.

The invention claimed is:

1. A memory hub to receive downstream memory requests and to process each received downstream memory request to determine whether the memory request includes a write command directed to the memory hub, the write command having a command portion and a data portion, and the memory hub configured in a first mode when the write command is directed to the hub to develop memory access signals to be applied to memory devices, terminate propagation of the data portion of the write command and allow propagation of the command portion of the write command to a downstream memory hub, the hub configured in a second mode when the write command is not directed to the hub to provide the command on a downstream output port to be coupled to a downstream memory hub.

2. The memory hub of claim 1 wherein the downstream memory request includes an address portion, and wherein the memory hub determines whether the write command is directed to the memory hub comprises comparing a value of the address portion to an address of the memory hub.

3. The memory hub of claim 1 wherein the memory access signals comprise address, control, and data signals to be applied to memory devices.

4. The memory hub of claim 1 wherein the hub is further to receive upstream memory responses and provide such responses on an upstream output port to be coupled to an upstream memory hub.

5. The memory hub of claim 1 wherein the downstream output port comprises an optical port.

6. A memory module, comprising: a plurality of memory devices; and a memory hub coupled to the memory devices and including a downstream input port to receive downstream memory requests, and the hub operable to process each received downstream memory request to determine whether the memory request includes a write command directed to the memory module, the write command having a command and write data, and the memory hub configured operable in a first mode when the write command is directed to the module to apply memory access signals to the memory devices, provide the command of the write command on a downstream output port to be propagated to a downstream memory hub and to terminate providing the write data of the write command on the downstream data port, the memory hub configured operable in a second mode when the write command is not directed to the module to provide the command on the downstream output port.

7. The memory module of claim 6 wherein the memory devices comprise dynamic random access memory devices.

8. The memory module of claim 6 wherein the hub is configured in the second mode to provide received write data on a downstream data port.

9. The memory module of claim 6 wherein the downstream memory request includes an address portion, and wherein the memory hub determines whether the write command is directed to the memory hub comprises comparing a value of the address portion to an address of the memory hub.

10. The memory module of claim 6 wherein the memory access signals comprise address, control, and data signals to be applied to memory devices.

11. The memory module of claim 6 wherein the hub is further to receive upstream memory responses and provide such responses on an upstream output port to be coupled to an upstream memory hub.

12. A method of operating a memory system having a plurality of memory modules coupled to each other by a high-speed link, each memory module including a memory hub, the method comprising:
applying a read command downstream on the high-speed link, the read command directed to a target read memory module;
receiving the read command at a memory module and determining whether the memory module receiving the read command is the target read memory module to which the read command is directed;
processing the read command when the memory module receiving the read command corresponds to the target read memory module and sending the read command downstream when the receiving memory module is not the target read memory module;
applying a write command on the high-speed link while the read data is propagating upstream on the high-speed link from the target read memory module to which the read command is directed, the write command having a write instruction portion and a write data portion, the write command directed to a target write memory module, the target write memory module upstream of the target read memory module;
receiving the write command at a memory module and determining whether the memory module receiving the read command is the target write memory module to which the write command is directed;
sending the write command downstream when the receiving memory module is not the target write memory module;
processing the write command when the memory module receiving the read command corresponds to the target write memory module and terminating the write data portion of the write command at the target write memory module to avoid collision of the write data portion and the read data on the high-speed link while allowing the write instruction portion of the write command to propagate downstream; and
sending read data upstream on the high speed link.

13. The method of claim 12 wherein terminating the write data portion of the write command enables the read data to be propagated upstream without colliding with the write data portion propagated downstream.

14. The method of claim 12, further comprising instruction portion of the write command at the write target memory module to which the write data is directed.

15. The method of claim 12 further comprising applying the read command relative to the write command by a time interval relative to the physical distance between the targeted memory module receiving the read command and the targeted memory module receiving the write command.

16. A method of processing write commands in a memory system having a hub architecture, the hub architecture including a plurality of memory hubs coupled to each other by a high-speed link, each memory hub being coupled to a plurality of memory devices, the method comprising:
   retrieving read data responsive to a read command received by a read target hub;
   forwarding read data upstream from the read target hub while concurrently forwarding write data downstream to a write target hub; and
   terminating the write data from propagating downstream before the read data propagating upstream arrives at the write target hub to avoid collision of the write data and read data on the high-speed link and allow a write command associated with the terminated write data to continue propagating downstream of the write target hub.

17. The method of claim 16 further comprising applying a write command on the high-speed link after the read command following a time delay indicative of the relative distance between the read target hub and the write target hub.

18. A method of operating a memory system having a plurality of memory modules coupled in series each other by a high-speed link, each memory module including a memory hub, the method comprising
   issuing a write command directed to a memory module;
   forwarding the write command downstream when the write command is received by a memory module to which the write command is not directed;
   processing the write command when the write command is received by the memory module to which the write command is directed and forwarding a portion of the write command further downstream;
   providing write data to the memory module to which the write command is directed responsive to the write command being processed; and
   terminating the write data at the memory module to which the write command is directed while the portion of the write command is forwarded downstream.

19. The method of claim 18 further comprising issuing a read command prior to issuing the write command, wherein a target memory module provides read data in response to receiving the read command and propagates the read data upstream, and wherein the write data at the memory module is terminated before the read data arrives at the memory module.

* * * * *

UNITED STATES PATENT AND TRADEMARK OFFICE
CERTIFICATE OF CORRECTION

PATENT NO. : 7,774,559 B2
APPLICATION NO. : 11/895894
DATED : August 10, 2010
INVENTOR(S) : Jeffrey J. Cronin et al.

It is certified that error appears in the above-identified patent and that said Letters Patent is hereby corrected as shown below:

In column 9, line 1, in Claim 14, delete "comprising instruction" and insert -- comprising terminating the instruction --, therefor.

In column 10, line 4, in Claim 18, delete "comprising" and insert -- comprising: --, therefor.

Signed and Sealed this

Twenty-sixth Day of October, 2010

David J. Kappos
*Director of the United States Patent and Trademark Office*